United States Patent
Lee et al.

(10) Patent No.: US 11,155,458 B2
(45) Date of Patent: Oct. 26, 2021

(54) DEVICE FOR PREVENTING OVERFLOW OF UREA WATER FOR VEHICLE

(71) Applicants: HYUNDAI MOTOR COMPANY, Seoul (KR); KIA MOTORS CORPORATION, Seoul (KR)

(72) Inventors: Tae Yoon Lee, Seoul (KR); June Young Park, Hwaseong-si (KR); Jun Sik Lim, Bucheon-si (KR); Sung Won Lee, Hwaseong-si (KR); Seung Hoon Choi, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/783,516

(22) Filed: Feb. 6, 2020

(65) Prior Publication Data

US 2020/0370460 A1 Nov. 26, 2020

(30) Foreign Application Priority Data

May 22, 2019 (KR) .................. 10-2019-0059960

(51) Int. Cl.
*F01N 3/28* (2006.01)
*B62D 21/16* (2006.01)
*B67D 7/36* (2010.01)

(52) U.S. Cl.
CPC .............. *B67D 7/362* (2013.01); *B62D 21/16* (2013.01); *F01N 2610/142* (2013.01); *F01N 2610/1413* (2013.01)

(58) Field of Classification Search
CPC .......... B60K 2015/03576; B60K 13/04; B60K 15/035; B60K 2015/03538; F01N 2610/1413; F01N 2610/142; B67D 7/362; B62D 21/16
See application file for complete search history.

(56) References Cited

U.S. PATENT DOCUMENTS

| | | | |
|---|---|---|---|
| 8,960,473 B2 * | 2/2015 | Grun ................ | B60K 15/03504 220/86.2 |
| 2015/0167529 A1 | 6/2015 | Lee et al. | |
| 2018/0105035 A1 * | 4/2018 | Radu ...................... | B60K 15/04 |
| 2018/0230881 A1 * | 8/2018 | Lee ......................... | B60K 15/04 |
| 2018/0291789 A1 * | 10/2018 | Gross .................... | F01N 3/2066 |

FOREIGN PATENT DOCUMENTS

| | | | |
|---|---|---|---|
| DE | 102014007709 A1 * | 12/2015 | ........... B60K 15/035 |
| JP | 2006-123897 A | 5/2006 | |
| KR | 10-2012-0051660 A | 5/2012 | |
| KR | 10-1510339 B1 | 4/2015 | |
| KR | 10-1519424 B1 | 5/2015 | |
| KR | 10-1673251 B1 | 11/2016 | |
| WO | 2011/001256 A1 | 1/2011 | |

* cited by examiner

*Primary Examiner* — Matthew T Largi
(74) *Attorney, Agent, or Firm* — Morgan, Lewis & Bockius LLP (57) ABSTRACT

The present disclosure relates to a device for preventing overflow of urea water out of an injection hole of a urea water tank when urea water is injected into the injection hole. The device is configured to enhance the function of a ventilation flow path, thus efficiently relieving pressure in the urea water tank when urea water is injected into the urea water tank.

9 Claims, 7 Drawing Sheets

FIG. 9

DEVICE FOR PREVENTING OVERFLOW OF UREA WATER FOR VEHICLE

CROSS REFERENCE TO RELATED APPLICATION

The present application claims priority to Korean Patent Application No. 10-2019-0059960, filed May 22, 2019, the entire contents of which is incorporated herein for all purposes by this reference.

TECHNICAL FIELD

The present disclosure generally relates to a device for preventing overflow of urea water for a vehicle. More particularly, the present disclosure relates to a device for preventing overflow of urea water for a vehicle, which is to prevent urea water from overflowing out of an injection hole when urea water is injected into the injection hole of a urea water tank.

BACKGROUND

Generally, a diesel engine vehicle typically uses a urea water system that is configured to supply urea water to a catalyst converter of an engine exhaust system and thus to reduce NOx included in exhaust gas. The urea water produces nitrogen and water when reacting with NOx in the exhaust gas ($NOx+NH_3 \rightarrow N_2+H_2O$).

The urea water system includes a urea water tank storing urea water and a dosing injector injecting urea water from the urea water tank to the catalyst converter. The urea water tank may be supplemented with urea water by using a urea water bottle or a urea water injection gun.

The urea water tank is provided with a leveling pipe to discharge pressure when urea water is injected into the urea water tank. The leveling pipe is clogged with a urea water surface when the urea water tank is full with urea water. When the leveling pipe is clogged, the inside of the urea water tank becomes a closed system and pressure in the urea water tank increases rapidly. As the pressure in the urea water tank increases, urea water injected into the urea water tank moves up to a urea water filler neck, and a sensing hole of the urea water injection gun is clogged with the urea water, so the operation of the urea water injection gun is stopped.

When the operation of the urea water injection gun is stopped as described above, urea water may overflow out of the urea water filler neck by the pressure in the urea water tank.

To prevent the overflow of urea water, a urea water injection gun of which an outer diameter smaller than an inner diameter of the urea water filler neck is used, so that ventilation is realized through a space between an inner surface of an injection hole of the urea water filler neck and an outer surface of the urea water injection gun.

However, there is a limit in securing the space between the inner surface of the injection hole of the urea water filler neck and the outer surface of the urea water injection gun. In addition, since pressure reduced through the space is smaller than pressure in the urea water tank which increases when urea water is injected into the urea water filler neck, it is difficult to relieve completely the pressure generated in the urea water tank when urea water is injected into the urea water filler neck, and thus urea water overflows out of the injection hole of the urea water filler neck due to the pressure in the urea water tank after the operation of the urea water injection gun is stopped.

DOCUMENTS OF RELATED ART (Patent Document 1) Korean Patent NO. 10-1510339

SUMMARY

Accordingly, the present disclosure has been made keeping in mind the above problems occurring in the related art, and the present disclosure is intended to propose a device for preventing overflow of urea water for a vehicle, which is configured to enhance the function of a ventilation flow path (an air exhaust passage), thus efficiently relieving internal pressure of a urea water tank when urea water is injected into the urea water tank through a urea water injection part.

In order to achieve the above object, according to one aspect of the present disclosure, there is provided a device for preventing overflow of urea water for a vehicle, the device includes: a urea water injection part connected to a urea water tank and in which an outlet of a urea water injector is insertable to supply urea water to the urea water tank; an air communicating part provided in the urea water injection part and having an internal space into which air in the urea water tank flows; an exhaust hole provided on the air communicating part to discharge the air flowing into the internal space of air communicating part to an outside of the air communicating part; and an exhaust hole opening and closing member disposed in the internal space of the air communicating part, and sliding by the outlet of the urea water injector inserted into the urea water injection part so as to open the exhaust hole.

Specifically, the device for preventing overflow of urea water may have the following characteristics.

The exhaust hole opening and closing member may include an opening provided on a center portion thereof and first and second ends disposed on opposite sides of the opening, and when the outlet of the urea water injector is not inserted in the urea water injection part, the second end may be disposed below the exhaust hole to close the exhaust hole. When the exhaust hole opening and closing member is pushed by the outlet of the urea water injector and slides, the opening may be disposed below the exhaust hole to open the exhaust hole. When the opening is disposed below the exhaust hole, air in the air communicating part may be discharged to the outside of the air communicating part through the exhaust hole.

In addition, inside the air communicating part, a supporting part supporting the first end of the exhaust hole opening and closing member such that the exhaust hole opening and closing member is slidable and an elastic member compressing the second end of the exhaust hole opening and closing member toward the supporting part may be disposed. An injection hole into which the outlet of the urea water injector is inserted may be provided on an upper side portion of the urea water injection part, and the supporting part may be disposed on a lower side of the injection hole. The supporting part may include a seat portion through which the first end of the exhaust hole opening and closing member passes and is placed thereon, wherein, when the outlet of the urea water injector is not inserted into the injection hole, the first end of the exhaust hole opening and closing member may be placed on the seat portion, and an inclined portion with a predetermined slope may be provided on an upper end of the first end of the exhaust hole opening and closing member.

When the outlet of the urea water injector is inserted into the injection hole, the outlet rectilinearly may descend along the injection hole and then enters the inside of the air communicating part, and when the inclined portion is pushed by the outlet entering the inside of the air communicating part, the exhaust hole opening and closing member may slide in a direction of compressing the elastic member.

In addition, the exhaust hole opening and closing member may be provided with a stopping step in order to stop the sliding of the exhaust hole opening and closing member by stopping the exhaust hole opening and closing member on an outer surface of the supporting part when the second end of the exhaust hole opening and closing member slides by being compressed by the elastic member and the first end thereof passes through the seat portion. The stopping step may be disposed at a rear side of the inclined portion on the basis of a sliding direction of the exhaust hole opening and closing member when the exhaust hole is opened.

Meanwhile, the injection hole may have an internal diameter smaller than an external diameter of the outlet of the urea water injector that is inserted into the injection hole, and thus a flow path may be provided between an outer surface of the outlet of the urea water injector and an inner surface of the injection hole so that air in the air communicating part is discharged when the outlet of the urea water injector is inserted into the injection hole.

According to the present disclosure, the device for preventing overflow of urea water for a vehicle can secure a second ventilation flow path by the exhaust hole of the air communicating part that is provided in the urea water injection part of the urea water tank, in addition to the first ventilation flow path provided by the injection hole when urea water is injected into the urea water tank. Accordingly, the internal pressure of the urea water tank can be efficiently relieved by the first and second ventilation flow paths.

According to the device, it is possible to prevent that urea water overflows out of the urea water injection part when urea water is supplied to the urea water tank.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinbelow, exemplary embodiments of the present disclosure will be described in detail with reference to the accompanying drawings such that the disclosure can be easily embodied by one of ordinary skill in the art to which this disclosure belongs.

A device for preventing overflow of urea water of the present disclosure increases a ventilation path for discharging air in a urea water tank when urea water is injected into the urea water tank, so that pressure generated in the urea water tank can be efficiently relieved. The device for preventing overflow of urea water reduces the pressure in the urea water tank which increases when urea water is injected therein, thereby preventing excessive generation of the pressure in the urea water tank. Accordingly, it is possible to prevent overflow of urea water to the outside of a urea water injection part due to excessive pressure when the urea water tank is full and a leveling pipe is clogged.

Figure 1:
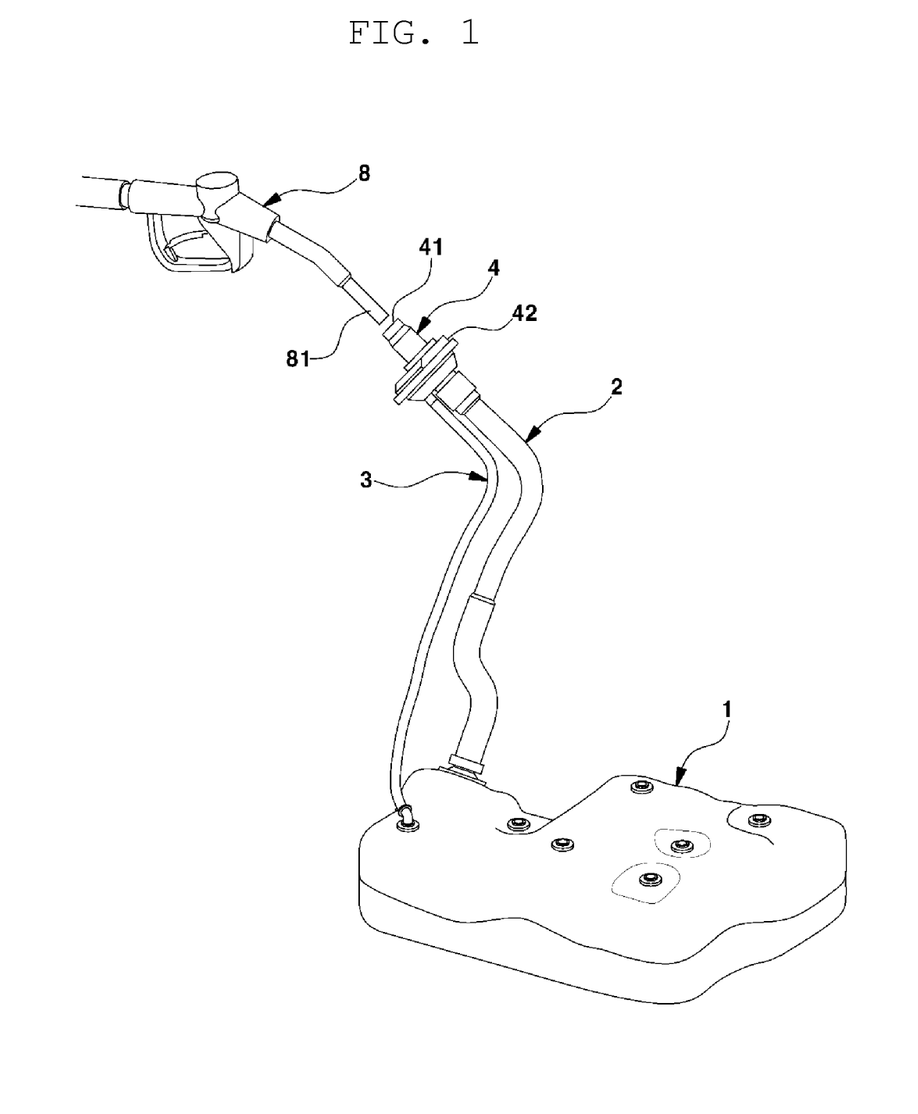
FIG. 1 is a view showing a urea water injection part of a urea water tank in which a device for preventing overflow of urea water according to the present disclosure is applied.

The device for preventing overflow of urea water is configured to increase selectively the ventilation path of the urea water tank 1 into which urea water is injected through a urea water injection part 4 (referring to FIG. 1).

As shown in FIG. 1, the urea water tank 1 has an internal space storing urea water used for reducing NOx included in engine exhaust gas. The urea water tank 1 is provided with the urea water injection part 4 for receiving urea water, and the urea water injection part 4 is connected to the urea water tank 1 through a urea water filler neck 2. The urea water filler neck 2 may introduce urea water to the urea water tank 1, the urea water being supplied from an outlet 81 of a urea water injector 8 inserted into the urea water injection part 4. The urea water injection part 4 is connected to an upper portion of the urea water filler neck 2. The urea water injector 8 may be a urea water injection gun having the outlet 81 for jetting urea water.

Figure 2:
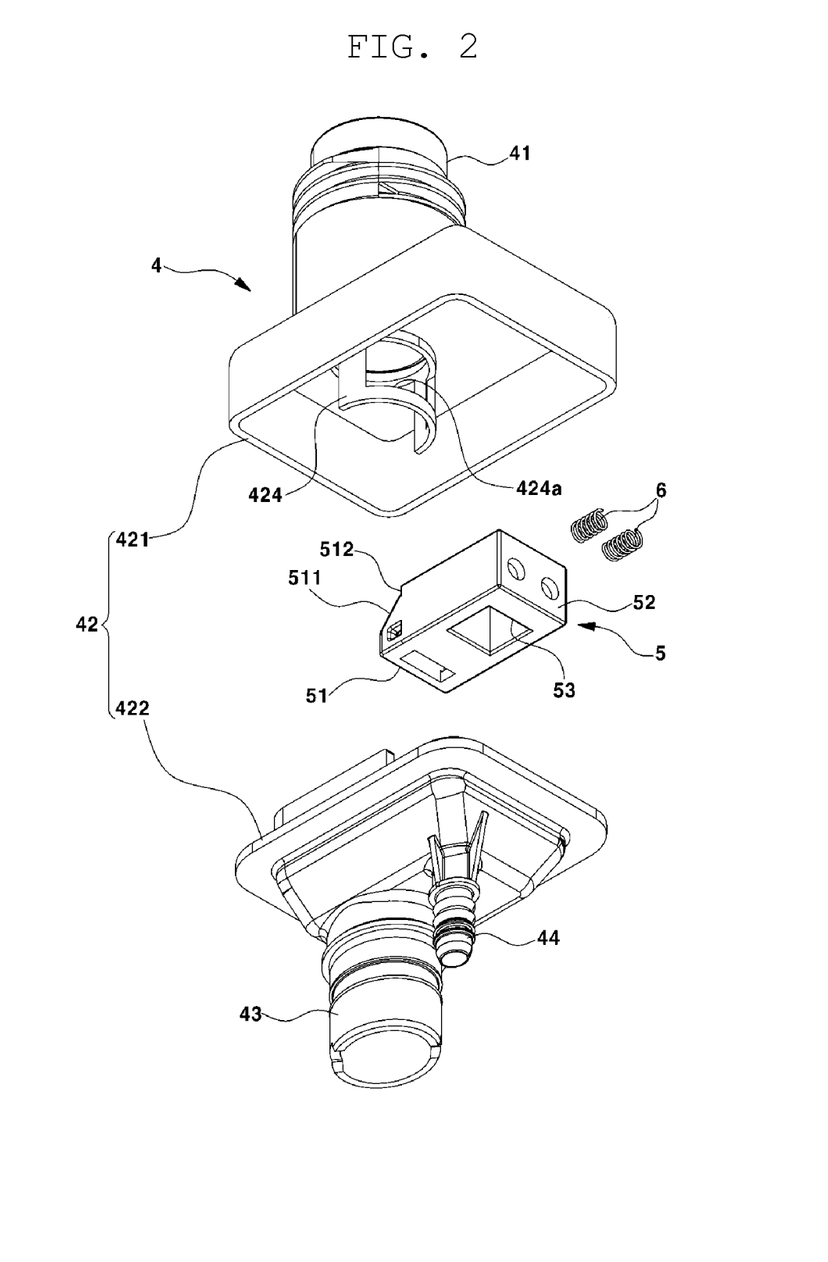
FIG. 2 is an exploded perspective view showing the device for preventing overflow of urea water according to the present disclosure.
Figure 3:
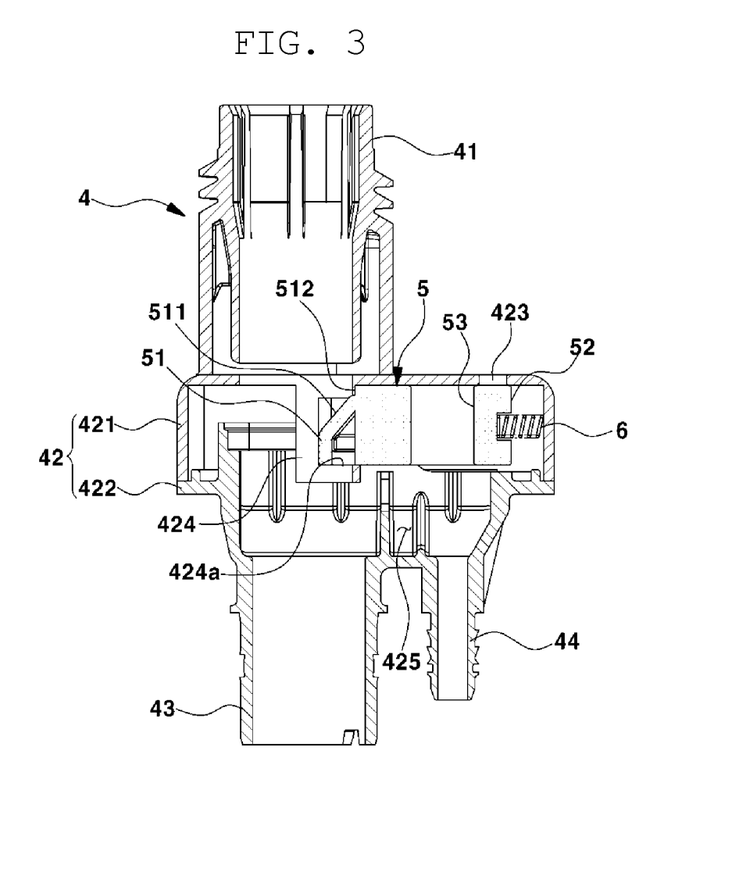
FIG. 3 is a sectional view showing an assembled state of the device for preventing overflow of urea water according to the present disclosure.
Figure 4:
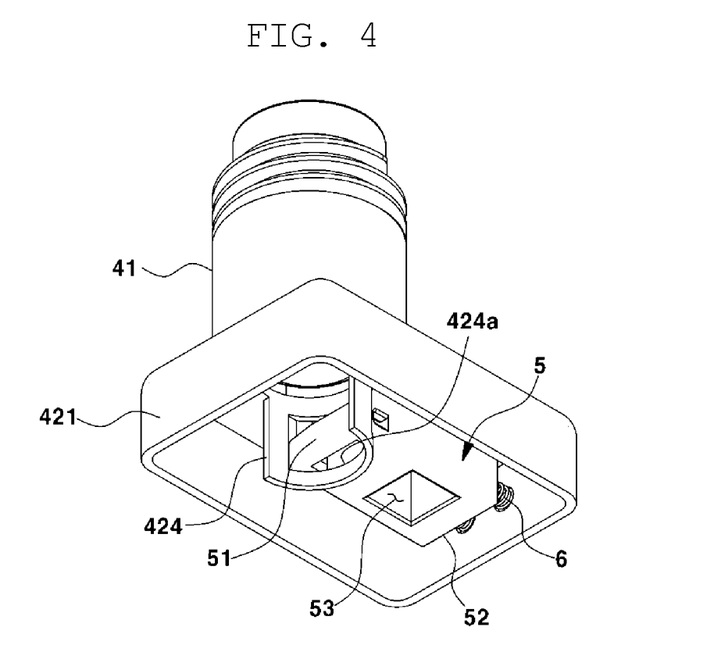
FIGS. 4 and 5 are views showing an exhaust hole opening and closing member in a normal state.
Figure 5:
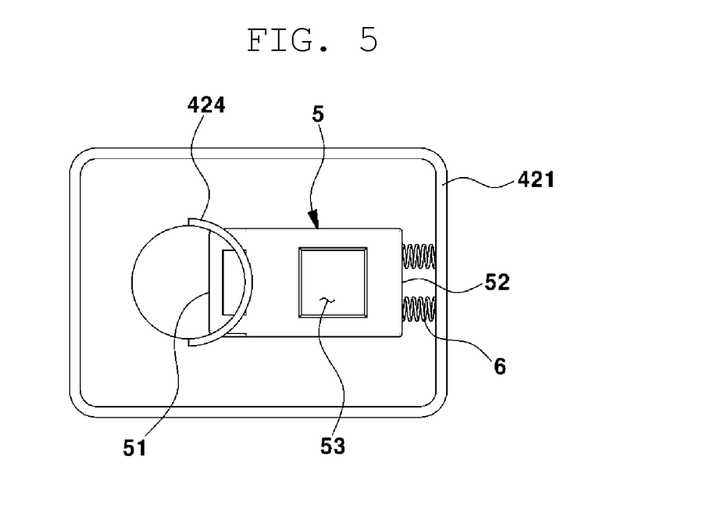
Figure 6:
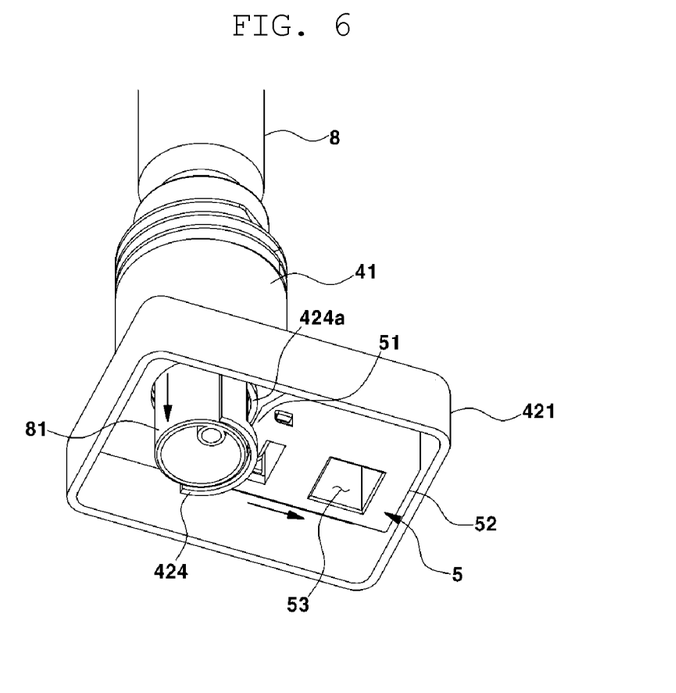
FIGS. 6 to 8 are views showing the exhaust hole opening and closing member when urea water is injected into the urea water.
Figure 7:
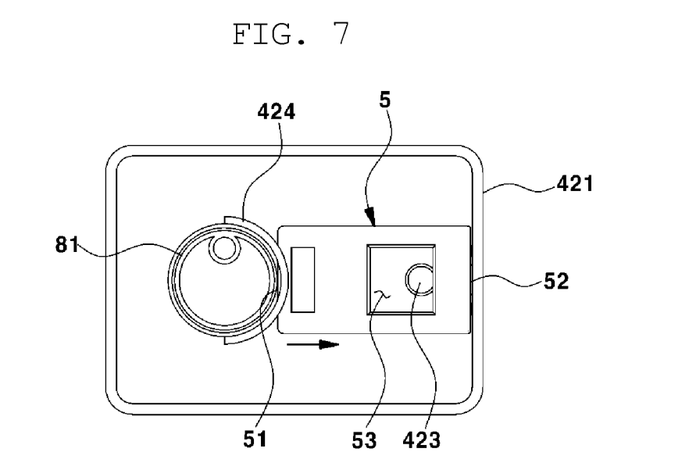

As shown in FIGS. 2 and 3, the urea water injection part 4 may be configured of an injection hole 41 on an upper portion thereof, an air communicating part 42 in the center thereof, and a filler neck coupler 43 and a pipe coupler 44 on a lower portion thereof.

The injection hole 41 forming the upper portion of the urea water injection part 4 may be formed in a shape of a pipe with an internal diameter greater than an external diameter of the outlet 81. Therefore, when the outlet 81 of the urea water injector 8 is inserted into the injection hole 41, a clearance (that is, a first ventilation flow path) is provided between an outer surface of the outlet 81 and an inner surface of the injection hole 41 to discharge air (referring to FIGS. 8 and 9). In other words, the clearance functions as the ventilation flow path between the outer surface of the outlet 81 inserted into the injection hole 41 and the inner surface of the injection hole 41. The outlet 81 of the urea water injector 8 is a part of jetting urea water and jets urea water when the outlet 81 is inserted into the injection hole 41.

Figure 8:
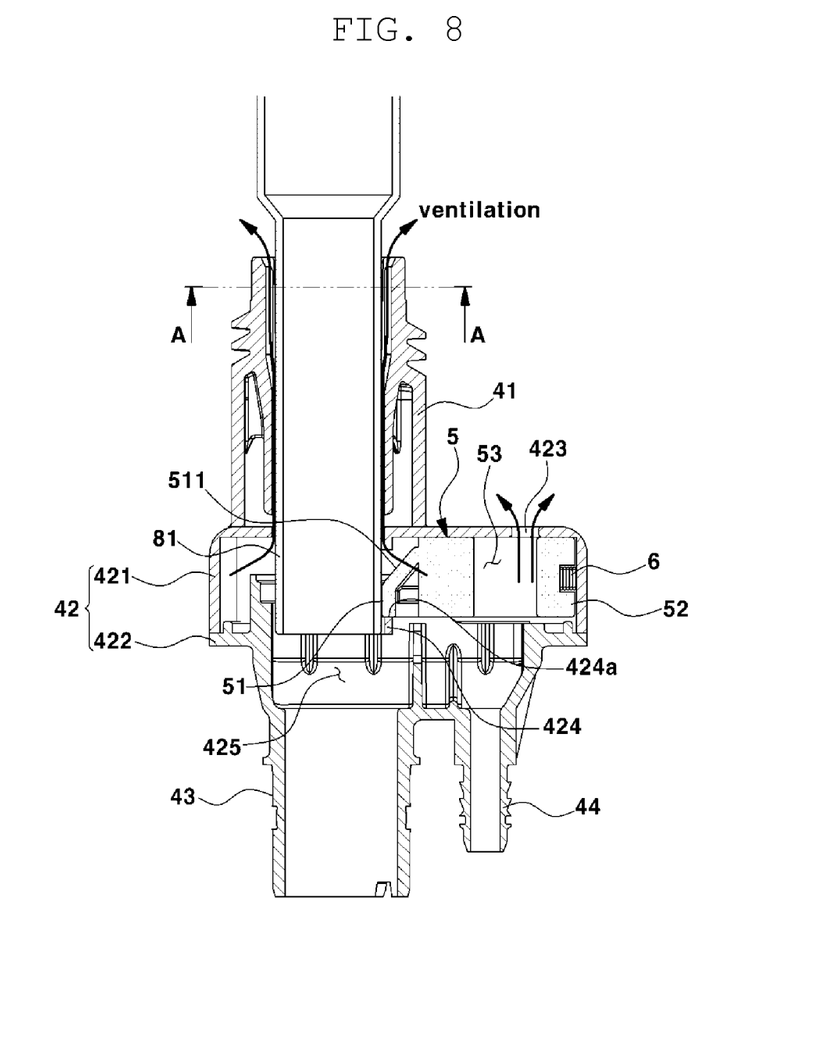
Figure 9:
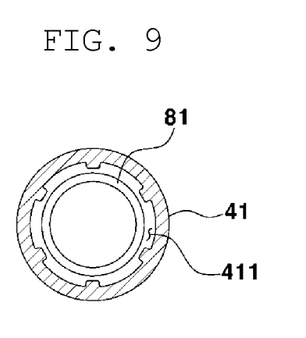
FIG. 9 is a view taken along A-A line of FIG. 8.

As shown in FIGS. 3 and 8, the air communicating part 42 forming the center part of the urea water injection part 4 has an internal space 425 into which air discharged from the urea water tank 1 may flow. The air communicating part 42 is disposed on a lower end of the injection hole 41, so that the internal space 425 is connected to the first ventilation flow path 411 of the injection hole 41 freely. Therefore, the air communicating part 42 may be connected to the outside (that is, atmosphere) of the urea water tank 1 by the injection hole 41. That is, the air communicating part 42 may be ventilated by the injection hole 41. In other words, the internal space 425 of the air communicating part 42 may be connected to the outside of the urea water tank 1, and air in the internal space 425 may be discharged to the outside of the injection hole 41 through the injection hole 41.

As shown in FIGS. 2 and 3, the air communicating part 42 may be configured of an upper body 421 integrally formed with the injection hole 41 and a lower body 422 disposed on a lower end of the upper body 421. The upper body 421 and the lower body 422 may be coupled by welding. The lower end of the upper body 421 and the upper end of the lower body 422 may be welded while being faced to each other.

The air communicating part 42 is provided with an exhaust hole 423 to discharge the air in the air communicating part 42 to the outside of the air communicating part 42. The exhaust hole 423 may be disposed on the upper end of the upper body 421 with a predetermined distance from the injection hole 41. The exhaust hole 423 may be formed by perforating the upper end of the upper body 421.

As shown in FIGS. 2 to 8, the exhaust hole 423 may be opened by the exhaust hole opening and closing member 5 disposed in the inside (in the internal space) of the air communicating part 42. The exhaust hole 423 is closed in normal times, and is opened when urea water is injected into the urea water tank 1. Therefore, the exhaust hole opening and closing member 5 maintains a sliding state by an elastic member 6 in a direction (that is, a first direction) of closing the exhaust hole 423 at normal times. However, when the outlet 81 of the urea water injector 8 is injected into the injection hole 41 for supplying urea water to the urea water tank 1, the exhaust hole opening and closing member 5 maintains a sliding state (a state of opening the exhaust hole 423) by the outlet 81 in a direction (that is, a second direction) of opening the exhaust hole 423.

The exhaust hole opening and closing member 5 is disposed with an opening 53 by perforating the center thereof. The opening 53 passes through the center of the exhaust hole opening and closing member 5 in the vertical direction, on the basis of an upper surface of the exhaust hole opening and closing member 5. The exhaust hole opening and closing member 5 has a first end 51 and a second end 52 which are disposed on the opposite sides of the opening 53 on the basis of the sliding direction of the exhaust hole opening and closing member 5.

When the first end 51 is disposed below the injection hole 41, the second end 52 is disposed below the exhaust hole 423, thereby closing the exhaust hole 423. When the exhaust hole opening and closing member 5 slides in the opening direction (that is, the second direction), the first end 51 moves from a lower side of the injection hole 41, the second end 52 moves from a lower side of the exhaust hole 423, and the opening 53 moves to the lower side of the exhaust hole 423. That is, when the exhaust hole opening and closing member 5 slides in the opening direction, the opening 53 is disposed below the exhaust hole 423 to open the exhaust hole 423. When the opening 53 is disposed below the exhaust hole 423, the air in the air communicating part 42 may be discharged to the outside of the air communicating part 42 through the exhaust hole 423. When the outlet 81 of the urea water injector 8 is removed from the injection hole 41 and thus the exhaust hole opening and closing member 5 slides in the closing direction (that is, the first direction), the second end 52 of the exhaust hole opening and closing member 5 is disposed again below the exhaust hole 423 to close the exhaust hole 423.

The exhaust hole opening and closing member 5 is slidably disposed inside the air communicating part 42. Therefore, a supporting part 424 and the elastic member 6 are disposed inside the air communicating part 42 to support the sliding of the exhaust hole opening and closing member 5.

The supporting part 424, which supports the first end 51 of the exhaust hole opening and closing member 5 such that the first end 51 is slidable, is disposed inside the air communicating part 42 and is disposed at a lower side of the injection hole 41. The supporting part 424 may be formed in a curved panel, a pipe type, etc., and may be integrally formed on an inner surface of the upper body 421. The supporting part 424 is provided with a seat portion 424a through which the first end 51 of the exhaust hole opening and closing member 5 passes and is placed thereon. The seat portion 424a may be formed by perforating the supporting part 424.

The first end 51 of the exhaust hole opening and closing member 5 may have an inclined portion 511 having a predetermined slope at an upper portion thereof. When the outlet 81 of the urea water injector 8 is inserted into the injection hole 41 and then enters the inside of the air communicating part 42, the outlet 81 slides along a surface of the inclined portion 511 and pushes the inclined portion 511.

When the outlet 81 of the urea water injector 8 pushes the inclined portion 511 so that the inclined portion 511 slides, the exhaust hole opening and closing member 5 moves in the second direction (the opening direction). When the outlet 81 of the urea water injector 8 is inserted into the injection hole 41, the outlet 81 compresses the inclined portion 511 while rectilinearly descending along the injection hole 41. Therefore, the exhaust hole opening and closing member 5 is pushed and slides in the opening direction by the outlet 81 of the urea water injector 8 passing through the injection hole 41 and entering the inside of the air communicating part 42.

The elastic member 6 is disposed between the second end 52 of the exhaust hole opening and closing member 5 and the inner surface of the upper body 421, and compresses the second end 52 toward the supporting part 424. The elastic member 6 is disposed between the second end 52 of the exhaust hole opening and closing member 5 and the upper body 421 in a compressed state, and pushes elastically the second end 52 of the exhaust hole opening and closing member 5 toward the supporting part 424. When the exhaust hole opening and closing member 5 slides by the outlet 81 of the urea water injector 8 to open the exhaust hole 423, the elastic member 6 is further compressed. That is, when the exhaust hole opening and closing member 5 slides in the direction of opening the exhaust hole 423, the elastic member 6 is further compressed. When the outlet 81 of the urea water injector 8 is removed from the injection hole 41, the exhaust hole opening and closing member 5 slides by the elastic member 6 and returns to an original position thereof. When the exhaust hole opening and closing member 5 returns to the original position thereof, the first end 51 is placed on the supporting part 424 and the second end 52 is disposed below the exhaust hole 423.

In addition, the exhaust hole opening and closing member 5 is provided with a stopping step 512 that is disposed on an upper rear portion of the inclined portion 511 on the basis of the direction of the exhaust hole opening and closing member 5 to open the exhaust hole 423. When the second end 52 of the exhaust hole opening and closing member 5 is compressed by the elastic member 6 and thus the first end 51 of the exhaust hole opening and closing member 5 passes through the seat portion 424a, the stopping step 512 is in contact with an outer surface of the supporting part 424 and is blocked, thereby stopping the sliding of the exhaust hole opening and closing member 5.

The filler neck coupler 43 and the pipe coupler 44 may be disposed on a lower end of the air communicating part 42 to form a lower portion of the urea water injection part 4. The filler neck coupler 43 is a portion to which the urea water filler neck 2 is coupled, and the pipe coupler 44 is a portion to which the leveling pipe 3 is coupled. The urea water filler neck 2 is configured to introduce urea water that is supplied by the outlet 81 of the urea water injector 8 inserted into the injection hole 41 to the urea water tank 1. When urea water is supplied to the urea water tank 1, the leveling pipe 3 discharges the air in the urea water tank 1 to the air communicating part 42.

The device for preventing overflow of urea water configured as described above has the following advantages.

1. The exhaust hole 423 is provided in addition to the first ventilation flow path 411 provided by the injection hole 41, so it is possible to prevent the pressure in the urea water tank 1 from increasing excessively without being relieved when urea water is injected into the urea water tank 1. In other words, a second ventilation flow path is provided by the exhaust hole 423 and is used to relieve pressure in the urea water tank 1 together with the first ventilation flow path 411 of the injection hole 41. Thus, when urea water is injected into the urea water tank 1, the pressure in the urea water tank 1 can be relieved efficiently.

2. The ventilation flow path is provided by the exhaust hole 423 before the leveling pipe 3 is clogged (that is, before the urea water tank is full), so it is possible to prevent the pressure in the urea water tank 1 from increasing rapidly when the urea water tank 1 is full with urea water.

3. The pressure in the urea water tank 1 is efficiently relieved after operation (supplying of urea water) of the urea water injector 8 is stopped, so it is possible to prevent urea water filled up to the urea water filler neck 2 due to the pressure in the urea water tank 1 from overflowing to the outside of urea water injection part 4.

4. The exhaust hole 423 is opened only when the outlet 81 of the urea water injector 8 is inserted into the injection hole 41, so it is possible to prevent foreign materials from entering the inside of the air communicating part 42 through the exhaust hole 423 in normal times.

The embodiment of the present disclosure have been described in detail above, the scope of the present disclosure is not limited to the exemplary embodiment, various modifications, additions and substitutions by those skilled in the art using the basic concept of the present disclosure as defined in the accompanying claims are also included in the scope of the present disclosure.

What is claimed is:

1. A device for preventing overflow of urea water for a vehicle, the device comprising:
   a urea water injection part connected to a urea water tank, and in which an outlet of a urea water injector is insertable to supply urea water to the urea water tank;
   an air communicating part provided in the urea water injection part and having an internal space into which air in the urea water tank flows;
   an exhaust hole provided on the air communicating part to discharge the air flowing into the internal space of the air communicating part to an outside of the air communicating part; and
   an exhaust hole opening and closing member disposed in the internal space of the air communicating part, and sliding by the outlet of the urea water injector inserted into the urea water injection part so as to open the exhaust hole,
   wherein the exhaust hole opening and closing member comprises an opening provided on a center portion thereof and first and second ends disposed on opposite sides of the opening, and when the outlet of the urea water injector is not inserted in the urea water injection part, the second end is disposed below the exhaust hole to close the exhaust hole,
   wherein inside the air communicating part, a supporting part supporting the first end of the exhaust hole opening and closing member such that the exhaust hole opening and closing member is slidable, and an elastic member compressing the second end of the exhaust hole opening and closing member toward the supporting part, are disposed,
   wherein an injection hole into which the outlet of the urea water injector is inserted is provided on an upper side portion of the urea water injection part, and the supporting part is disposed on a lower side of the injection hole,
   wherein the supporting part comprises a seat portion through which the first end of the exhaust hole opening and closing member passes and is placed thereon, and
   wherein, when the outlet of the urea water injector is not inserted into the injection hole, the first end of the exhaust hole opening and closing member is placed on the seat portion, and an inclined portion with a predetermined slope is provided on an upper end of the first end of the exhaust hole opening and closing member.

2. The device of claim 1, wherein when the exhaust hole opening and closing member is pushed by the outlet of the urea water injector and slides, the opening is disposed below the exhaust hole to open the exhaust hole.

3. The device of claim 2, wherein when the opening is disposed below the exhaust hole, air in the air communicating part is discharged to the outside of the air communicating part through the exhaust hole.

4. The device of claim 1, wherein, when the outlet of the urea water injector is inserted into the injection hole, the outlet rectilinearly descends along the injection hole and then enters the inside of the air communicating part, and when the inclined portion is pushed by the outlet entering the inside of the air communicating part, the exhaust hole opening and closing member slides in a direction of compressing the elastic member.

5. The device of claim 1, wherein the exhaust hole opening and closing member includes a stopping step configured to stop the sliding of the exhaust hole opening and closing member by stopping the exhaust hole opening and closing member on an outer surface of the supporting part when the second end of the exhaust hole opening and closing member slides by being compressed by the elastic member and the first end thereof passes through the seat portion.

6. The device of claim 5, wherein the stopping step is disposed at a rear side of the inclined portion on the basis of a sliding direction of the exhaust hole opening and closing member when the exhaust hole is opened.

7. The device of claim 1, wherein the injection hole has an internal diameter smaller than an external diameter of the outlet of the urea water injector that is inserted into the injection hole.

8. The device of claim 7, wherein a flow path is provided between an outer surface of the outlet of the urea water injector and an inner surface of the injection hole so that air in the air communicating part is discharged when the outlet of the urea water injector is inserted into the injection hole.

9. The device of claim 1, wherein the urea water injection part is provided with a filler neck coupler and a pipe coupler at a lower side thereof, the couplers being disposed on a lower end of the air communicating part, the filler neck coupler is coupled to a urea water filler neck allowing urea water supplied by the urea water injector to flow into the urea water tank, and the pipe coupler is coupled to a leveling pipe that discharges the air in the urea water tank to the air communicating part when urea water is injected into the urea water tank.

* * * * *